(12) United States Patent  
Sagues et al.

(10) Patent No.: US 7,822,896 B1  
(45) Date of Patent: Oct. 26, 2010

(54) ELECTRONICALLY CONFIGURABLE CONNECTOR MODULE

(75) Inventors: Paul Sagues, Ross, CA (US); Larry Brasfield, Mercer Island, WA (US); Peter K. Moy, Oakland, CA (US)

(73) Assignee: Berkeley Process Control, Inc., Richmond, CA (US)

(*) Notice: Subject to any disclaimer, the term of this patent is extended or adjusted under 35 U.S.C. 154(b) by 6 days.

(21) Appl. No.: 12/106,968

(22) Filed: Apr. 21, 2008

Related U.S. Application Data

(63) Continuation-in-part of application No. 11/801,127, filed on May 7, 2007, now abandoned, which is a continuation of application No. 11/296,134, filed on Dec. 6, 2005, now Pat. No. 7,216,191, which is a continuation-in-part of application No. 11/043,296, filed on Jan. 25, 2005, now abandoned, which is a continuation-in-part of application No. 10/071,870, filed on Feb. 8, 2002, now Pat. No. 6,892,265.

(60) Provisional application No. 60/950,040, filed on Jul. 16, 2007, provisional application No. 60/269,129, filed on Feb. 14, 2001.

(51) Int. Cl.  
*G06F 13/00* (2006.01)

(52) U.S. Cl. .................................................. 710/104

(58) Field of Classification Search ............... 710/8–12, 710/300–306, 308–317, 104–105, 62–64, 710/72–74  
See application file for complete search history.

(56) References Cited

U.S. PATENT DOCUMENTS 3,795,901 A   3/1974   Boehm et al. ............ 340/172.5

| 4,360,913 | A | | 11/1982 | Struger et al. ............... 370/535 |
| 4,695,955 | A | | 9/1987 | Faisandier ................... 364/413 |
| 4,954,949 | A | | 9/1990 | Rubin | |
| 5,064,387 | A | | 11/1991 | Lybrand ...................... 439/607 |
| 5,327,098 | A | | 7/1994 | Molina et al. ................ 330/254 |
| 5,371,858 | A | * | 12/1994 | Miller et al. ................. 709/222 |
| 5,379,184 | A | | 1/1995 | Barraza et al. .............. 361/685 |

(Continued)

FOREIGN PATENT DOCUMENTS

EP              0 436 458           7/1991

OTHER PUBLICATIONS

"The effects of the Main Variables in the Percussive Arc Welding of Electrical Interconnections," by Holley et al. (abstract only) Publication date: Dec. 1965.

(Continued)

*Primary Examiner*—Raymond N Phan  
(74) *Attorney, Agent, or Firm*—David H. Jaffer; Pillsbury Winthrop Shaw Pittman LLP

(57) ABSTRACT

An input/output module includes a device communication connector apparatus for connecting at least one conductor between the module and at least one device and interface apparatus for causing the module to place any of a plurality of signals on any of a plurality of contacts of the device communication connector apparatus. The interface apparatus includes at least one electronic integrated circuit providing a selectable interconnection apparatus to a particular one of the contacts. The interface apparatus is configurable by a user of the module. A method of configuring the module includes providing inputs on a personal computer, communicating with a web server embedded in the module, to determine a specific interconnection apparatus for each of the contacts.

20 Claims, 13 Drawing Sheets

U.S. PATENT DOCUMENTS

| | | | |
|---|---|---|---|
| 5,423,697 A | 6/1995 | MacGregor | |
| 5,596,169 A | 1/1997 | Baker et al. | 174/33 |
| 5,630,170 A | 5/1997 | Koizumi et al. | 710/12 |
| 5,635,841 A | 6/1997 | Taylor | 324/380 |
| 5,659,800 A * | 8/1997 | Zhang et al. | 710/62 |
| 5,696,988 A | 12/1997 | Dale et al. | 395/821 |
| 5,701,515 A | 12/1997 | Gradeler | 710/14 |
| 5,872,999 A | 2/1999 | Koizumi et al. | 710/72 |
| 5,897,399 A | 4/1999 | Emergy | 439/709 |
| 5,905,249 A * | 5/1999 | Reddersen et al. | 235/462.15 |
| 5,938,754 A * | 8/1999 | Edwards et al. | 710/305 |
| 5,983,290 A * | 11/1999 | Obata et al. | 710/38 |
| 6,077,125 A | 6/2000 | Emergy | 439/638 |
| 6,301,633 B1 | 10/2001 | Chapman | 710/305 |
| 6,349,235 B1 | 2/2002 | Gibart et al. | 700/11 |
| 6,375,344 B1 * | 4/2002 | Hanson et al. | 710/303 |
| 6,553,432 B1 | 4/2003 | Critz et al. | 710/10 |
| 6,651,877 B2 | 11/2003 | Fukuda et al. | 235/375 |
| 6,892,265 B2 | 5/2005 | Sagues et al. | 710/301 |
| 7,003,608 B2 | 2/2006 | Brudeseth | 710/110 |

OTHER PUBLICATIONS

Sasaki, S., et al., "High-density and high-pin count flexible SMD Connector for High-Speed Data Bus" (abstract only).

Beaman, B., "High Performance Mainframe Computer Cables" (abstract only).

Marshall, RC, "A New Approach to Couple/Decouple Networks fro EMC Testing" (Jul. 12-13, 1999) (abstract only).

Mikjc-Rakjc, M. et al., "A Connector-Aware Middleware for Distributed Deployment and Mobility," (May 19-22, 2003) (abstract only).

* cited by examiner

Conductor Connected with
Mating Connectors

Conductor Connected with One
Mating Connector and One
Terminal Block Connector

This application claims the benefit of U.S. Provisional Application Ser. No. 60/950,040 filed Jul. 16, 2007, and is a continuation-in-part of U.S. patent application Ser. No. 11/801,127 filed May 7, 2007 (now abandoned), which is a continuation of U.S. patent application Ser. No. 11/296,134 filed Dec. 6, 2005, (now U.S. Pat. No. 7,216,191), which is a continuation-in-part of U.S. patent application Ser. No. 11/043,296 filed Jan. 25, 2005 (now abandoned), which is a continuation-in-part of U.S. patent application Ser. No. 10/071,870 filed Feb. 8, 2002 (now U.S. Pat. No. 6,892,265), which claims the benefit of U.S. Provisional Application Ser. No. 60/269,129 filed Feb. 14, 2001. The foregoing disclosures are incorporated herein by reference.

ELECTRONICALLY CONFIGURABLE CONNECTOR MODULE

CROSS-REFERENCE TO RELATED APPLICATIONS

BACKGROUND OF THE INVENTION

1. Field of Use for the Invention

The present invention relates generally to cabling/wiring and cabling/wiring systems, and more particularly to a universal cabling/wiring system wherein the requirement for specific wire interconnections between first and second devices is accomplished through use of a programmable I/O module.

2. Description of the Related Art

Sensors and actuators are connected to electronic control systems by wire and cabling systems. Sensors carry information into the control system. Sensors enable the measurement of such values as temperature, pressure, flow, proximity and human input. In contrast, actuators produce the action of the control system. Actuators include solenoids that enable the flow of motive air or fluid, and relays that provide power to motors, fans and heaters. Together, sensors and actuators make up the input and output (I/O) devices of modern electronic control systems.

Prior art control systems connect to sensors and actuators by employing a multitude of different fixed-configuration electrical circuits. Multiple instances of a given electrical circuit are packaged into modules in order to facilitate connection to sensors or actuators. Prior art input/output systems therefore typically employ dozens of different modules that are either input or output types. In addition, each category—input and output—is further classified by whether it is sourcing or sinking, sometimes called positive logic and negative logic, or PNP and NPN. In addition, each category of input/output module is further classified by whether it handles on/off signals, commonly called digital signals, or continuously varying signals, commonly called analog signals. Thus, a given prior art control system for a certain industrial application will often have four or more fixed-configuration input/output modules, handling digital inputs, digital outputs, analog inputs and analog outputs. More than four modules might be required if signals are not all sourcing or all sinking or if analog signals are of different formats, such as voltage, current, and different magnitudes.

The fixed configuration input/output systems of the prior art have remained essentially unchanged since the first electronic input/output systems were introduced about forty years ago. Today, input/output products are advertised and promoted based upon how many digital inputs, digital outputs, analog inputs and analog outputs they possess. Only two minor improvements have been made, neither changing the fixed configuration nature of the prior art.

The first improvement seen in the prior art came from the computer industry where "buses" are used to transfer signals into and out of memory. See U.S. Pat. No. 3,795,901 to Boehm et al. which discloses a bi-directional memory bus. Buses are now used in personal computers—disk drives are connected to the computer with cables containing bi-directional data busses. Some board-level products have been sold that offer bi-directional data pins, but such systems are not configurable. However, there is a crude level of configurability in so far as the direction of the fixed configuration signals can be reversed.

The second improvement seen in the prior art has been the use of programmable gain amplifiers to handle different input voltage ranges for modules configured as analog inputs. See U.S. Pat. No. 5,327,098 to Molina et al. which discloses a refinement of a well known programmable gain amplifier that is capable of variously amplifying different levels of voltages to better match the analog-to-digital converter. This prior art provides an input channel that is an analog input configured for voltage. However, only the level of the voltage may be adjusted.

Therefore, there is still a need to be able to readily reconfigure the basic input/output circuit, and there is still a need for a fully configurable input that can accommodate more than just different voltage levels.

Inevitably, the systems of the prior art all require that the user of the input/output module connect, by wire or cable, their sensors or actuators to specific terminals or connector pins on the input/output module. As a result, standard cables cannot in general be used to hook up the sensors and actuators. Because there is no standard format for sensor and actuator wiring, the user of these prior art systems must configure the wiring of the sensor or actuator to match the fixed configuration format of the input/output module.

Other than applying long-used bi-directional data techniques and programmable gain amplifiers, the design of the prior art input/output systems has remained remarkably unchanged for more than 40 years. There is a need for fully configurable input/output channels.

In addition, the prior art input/output systems do not provide for power to be supplied to the sensor or actuator. One skilled in the art knows that power for sensors and actuators must be supplied by separate power wiring which is not a part of the input/output module wiring. Once again, the user of the prior art is required to design wiring systems that are not simply point-to-point. Rather than standard cables, the user must design wiring harnesses which are custom, often complex assemblies of multiple connectors and conductors.

FIGS. 1A-1D and 2A-2D depict four different sensors and actuators along with their respective input or output circuits. One skilled in the art recognizes that these sensors may be any of a wide variety of devices such as proximity, temperature or pressure sensors. Similarly, the actuators may be any of a wide range of actuators, such as solenoids, stepper motors and relays. FIG. 1A depicts a sensor which sources current to its output terminal and must be connected to an input module with an input circuit designed for sourcing sensors. FIG. 1B depicts an input circuit, as might be found inside a prior art input module, where the input circuit is designed to accept a signal from a sensor which sources current. FIG. 1C depicts a sensor which sinks current and must be connected to an input module with an input circuit designed for sinking sensors. FIG. 1D depicts an input circuit, as might be found inside a prior art input module, where the input circuit is designed to accept a signal from a sensor which sinks current. FIG. 2A depicts an actuator which must be connected to an output module with an output circuit designed for sinking loads. FIG. 2B depicts an output circuit which sinks current. FIG. 2C depicts a compound actuator made up of two solenoids, such as would be found in a pneumatic valve manifold. Such a compound actuator must be connected to an output module with an output circuit designed for sourcing loads. Note that this compound actuator requires only three conductors to be connected up in order to operate. FIG. 2D depicts an output circuit designed to source current to its output terminal.

The sensors, actuators and input/output circuits depicted in FIGS. 1A-1D and 2A-2D are a small sample of the universe of sensors, actuators and circuits. In a given machine or process, an engineer generally expects all four of these categories of devices to be part of an input/output system. In addition, if analog sensors and actuators are to be used, more categories of input/output circuits will be required.

Sensors and actuators are wired to input/output modules with cables and connectors. FIGS. 3A and 3B depict an actuator 80 with three conductors that are internally connected to the actuator. The conductors form what is commonly called a "pig tail". The three conductors 68 grouped together are called a cable 68B. Herein, a group of conductors is referred to as a cable. In FIG. 3A, the conductors 68 have attached to them connectors 69B which are for plugging into mating connectors. In the example shown in FIG. 3B, the conductors 68 have no connectors and are suitable for connecting to terminal blocks, a common type of connector.

FIG. 4A depicts a situation in which mating connectors 69B and 71B are used on both ends of the conductor 68 to connect with connectors 69 and 71 on the device 80 and the input/output module 66, respectively. FIG. 4B depicts the situation in which a mating connector is attached to the device end of the conductor 68 whereas the input/output module end is connected with a terminal block connector. Thus, the prior art describes a number of wiring techniques for attaching sensors and actuators to input/output systems.

FIG. 5 is generally representative of the prior art input/output systems in use today in a wide variety of industries around the world. Whether in Programmable Logic Controllers (PLC's) or Distributed Control Systems (DCS), sensors as show in FIGS. 1A-1D are wired to input/output systems using the teaching of FIG. 5. Because the two sensors shown in FIG. 5 wired to the input/output system are not either both sourcing or both sinking, the prior art requires that two fixed-circuit input modules be used, one a pull-down module for use with the sourcing sensor and the other module a pull-up module for use with the sinking sensor. FIG. 5 shows that the prior art wiring systems require many more wires than needed to simply connect the sensors to the input modules. In this case, ten wires are required to connect six terminals, three on each of the two sensors. In addition, only one input is used on each of the two input modules. In general, the prior art approach results in poor utilization of the channels on the input/output modules.

Terminal blocks are the preferred wiring system for most PLCs and input/output modules because wire harnesses can become very complex. For example, FIG. 6 takes the wiring layout from FIG. 5 and makes it into a wire harness. Note that this harness is very complicated and is essentially a three-dimensional web of conductors. Although harnesses are sometimes used, especially in specialty applications such as airplanes and automobiles, harnesses are inflexible, difficult to design, handle and repair.

The prior art does no better with actuators. FIG. 7 depicts a system of two output modules connecting the two types of actuators of FIGS. 2A-2D. In order to demonstrate the limitations of the prior art, two typical actuator groups have been selected—one requiring a sourcing output and one requiring a sinking output. Therefore, two output modules are required to complete the system. As with the input circuit shown in FIG. 5, the output circuit of FIG. 7 requires ten conductors to connect six terminals of the two types of actuators. Similarly, only three of sixteen output channels on the two output modules of FIG. 7 are used and only two of sixteen input channels on the two input modules of FIG. 5 are used. This is an inefficient use of the I/O channels.

In FIG. 8, the wiring harness for the output circuit of FIG. 7 is shown. As noted for the input harness of FIG. 6, the harness of FIG. 8 is also complex. As discussed below, a major limitation of the prior art is that the harness of FIG. 6 is different from the harness of FIG. 8. A user of input/output systems must use two different harnesses. The fact that harnesses in general are unique and custom helps to explain why those skilled in the art prefer to use individual wires and terminal block connectors because the interconnections can be built piece-by-piece.

In conclusion, the prior art apparatus for connecting sensors and actuators to fixed configuration input/output modules results in systems that have unique wiring layouts that employ a large number of conductors and make poor use of input/output channels. These systems with large numbers of partially-utilized input/output modules are inefficient. The significance of these limitations of the prior art cannot be overstated. A major result of this poor efficiency and excess of conductors is that input/output systems tend to be centralized in order to make better use of the input/output module resources and to provide for enough space for the wiring, not to mention the labor required to perform the wiring. Despite the long-held goal by those skilled in the art of control system design to provide for more distributed input/output systems where the input/output modules are physically distributed so as to be closer to sensors and actuators, the limitations of the prior art tend to reduce the advantages of distributed input/output systems and encourage the use of older centralized input/output system designs. Therefore, there remains a need for I/O modules with fully configurable input/output channels.

SUMMARY OF THE INVENTION

The concepts and methods of the invention allow the cost and complexity of connecting sensors and actuators to a control system to be reduced by providing a user configurable I/O module. Furthermore, the invention provides an I/O module which reduces the cost of distributed I/O architectures. According to aspects of the invention, an input/output module includes: a device communication connector apparatus for connecting at least one conductor between the module and at least one device; interface apparatus for causing the module to place any of a plurality of signals on any of a plurality of contacts of the device communication connector apparatus; wherein the interface apparatus includes at least one electronic integrated circuit providing a selectable interconnection apparatus to a particular one of the contacts; and wherein the interface apparatus is configurable by a user of the module. The device communication connector apparatus may include one or more of a terminal block for connecting individual wires and a standard mating connector for connecting wires or cables. The selectable interconnection apparatus may be an input, output or power supply. Furthermore, the selectable interconnection apparatus may be a sourcing, sinking, analog, digital, frequency measurement, frequency generation, serial communication receiver or serial communication transmitting circuit. The electronic integrated circuit may be an ASIC or a hybrid integrated circuit. Furthermore, the interface apparatus may include one or more of a multi-chip module and/or a system-in-a-package.

The I/O module of the present invention is configurable, so as to place any of a plurality of signals on any of a plurality of contacts of the device communication connector, by selecting an interconnection apparatus for each of the contacts. The interface apparatus includes at least one electronic integrated circuit providing a selectable interconnection apparatus to a particular one of the contacts in response to user input. User input may be one or more of: communications to the module over a network, configuration of jumper blocks on a module circuit board, and instructional data stored in a module memory.

According to further aspects of the invention, a method is provided for configuring I/O channels on a configurable connectorized system, the system comprising a module including (i) a device communication connector apparatus with a plurality of contacts and (ii) an interface apparatus including at least one electronic integrated circuit providing a selectable interconnection apparatus to a corresponding at least one of the contacts, the method comprising the step of commanding the interface apparatus to place any of a plurality of signals on any of the plurality of contacts of the device communication connector. The commanding step may include one or more of: receiving instructions from a controller apparatus, communications to the module over a network, configuration of jumper blocks on a module circuit board, and receiving instructions in the form of data stored in a module memory. The system may further include an embedded web server programmed to provide configuration pages for devices connected to the device communication connector. In the case of the latter, a system user may: (a) connect the module to a personal computer; (b) open one of the configuration pages; and (c) provide inputs on the personal computer to determine a specific interconnection apparatus for each of the contacts.

According to yet further aspects of the invention, a method is provided for directing a signal between a system controller and at least one device using a configurable connectorized system, the system comprising a module including (i) a device communication connector apparatus with a plurality of contacts and (ii) an interface apparatus including at least one electronic integrated circuit providing a selectable interconnection apparatus to a corresponding at least one of the contacts, the method comprising the steps of: (a) creating a signal path between the system controller and the module; (b) connecting at least one conductor between the device communication connector apparatus and a first device; and (c) causing the module to place any of a plurality of signals on any of the plurality of contacts of the device communication connector apparatus. Furthermore, the method may further comprise the step of connecting at least one conductor between the device communication connector apparatus and a second device.

DETAILED DESCRIPTION

The present invention will now be described in detail with reference to the drawings, which are provided as illustrative examples of the invention so as to enable those skilled in the art to practice the invention. In general, the present invention contemplates a configurable I/O module for use in efficiently connecting sensors and actuators to a controller. However, the configurable I/O module is not limited to this use. For example, the module may be used in a system without connecting to a system controller. The module may operate in a stand-alone fashion, for example performing temperature control. Alternatively, the module may operate as an embedded controller wherein the module acts as a machine controller, for example. The module is configurable by the user and various methods are available to the user for configuration of the module.

Figure 1A:
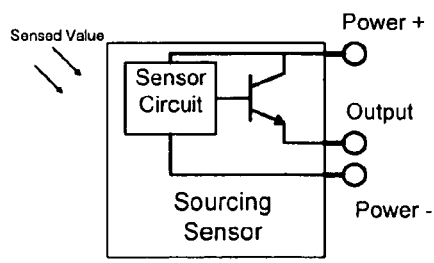
FIG. 1A is a schematic of a sensor which sources current at its output terminal.
Figure 1B:
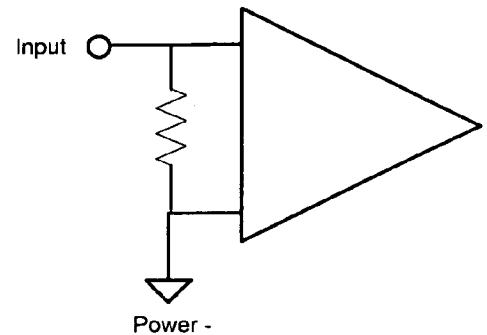
FIG. 1B is a schematic of an input circuit intended to be connected to a sourcing sensor.
Figure 1C:
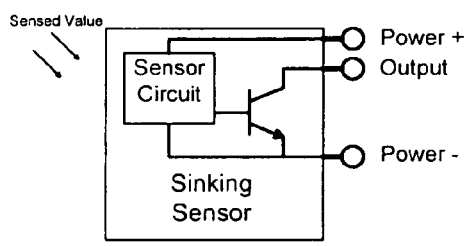
FIG. 1C is a schematic of a sensor which sinks current at its output terminal.
Figure 1D:
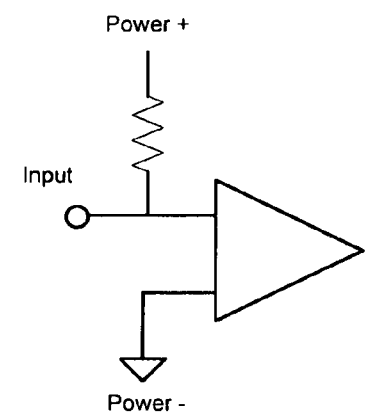
FIG. 1D is a schematic of an input circuit intended to be connected to a sinking sensor.
Figure 2A:
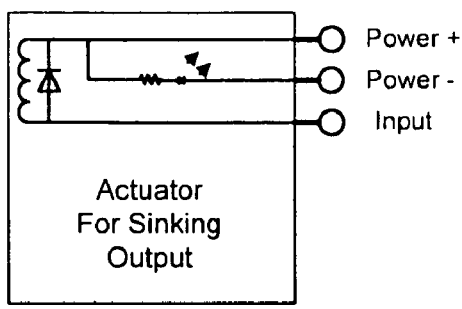
FIG. 2A is a schematic of an actuator intended to be connected to an output circuit which sinks current at its output terminal.
Figure 2B:
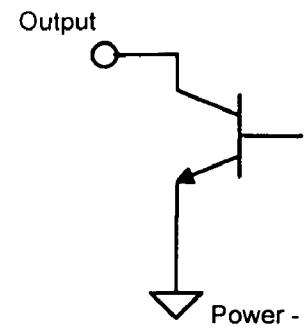
FIG. 2B is a schematic of an output circuit which sinks current at its output terminal.
Figure 2C:
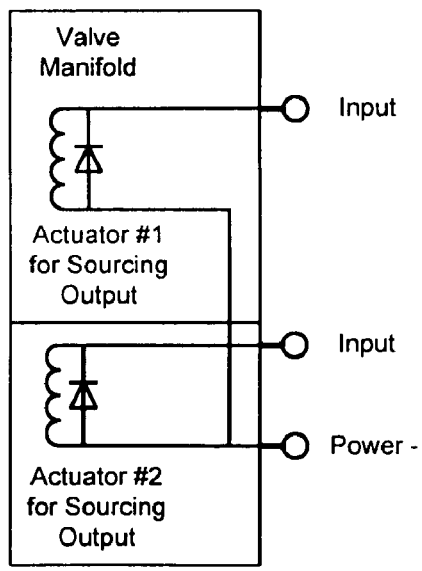
FIG. 2C is a schematic of an actuator intended to be connected to an output circuit which sources current at its output terminal.
Figure 2D:
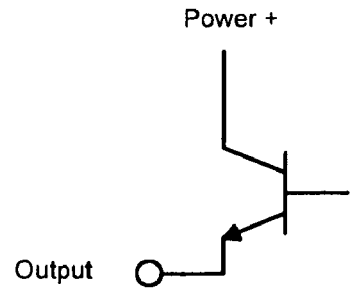
FIG. 2D is a schematic of an output circuit which sources current at its output terminal.
Figure 3A:
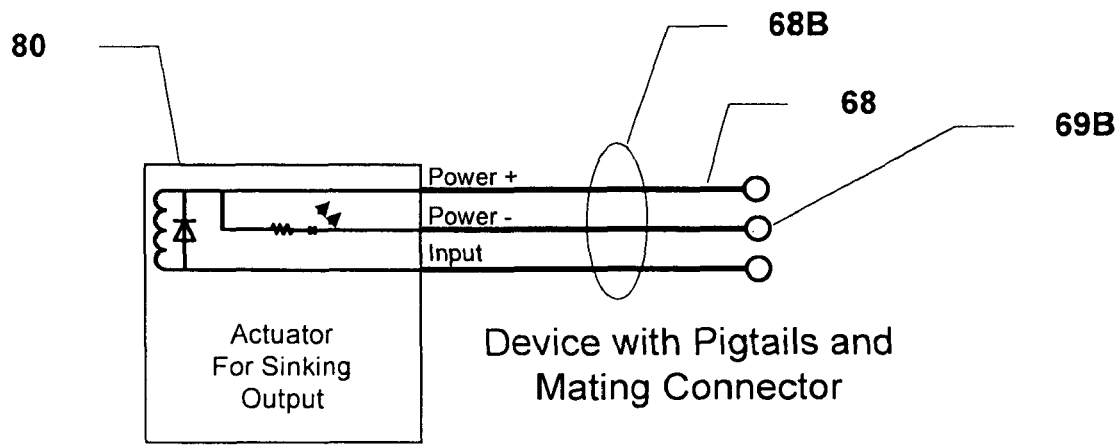
FIG. 3A is a schematic of a pig tail sensor with mating connectors on the end of the pig tail.
Figure 3B:
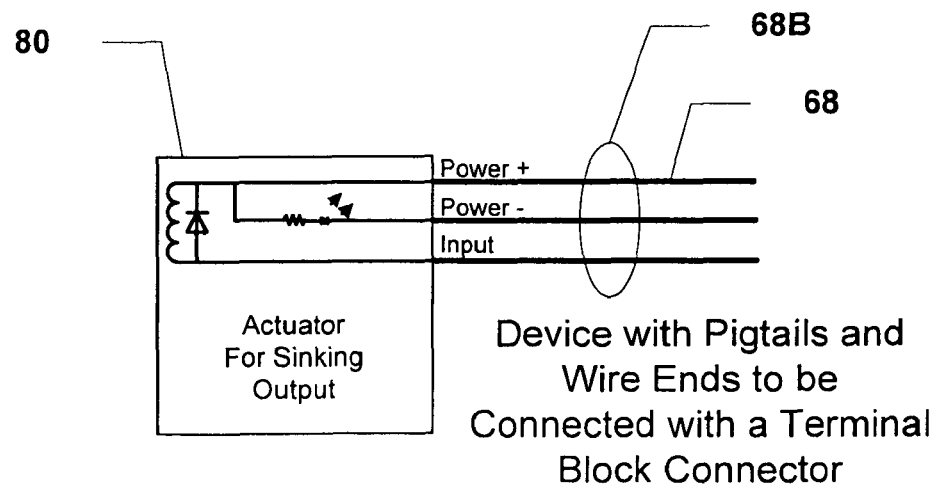
FIG. 3B is a schematic of a pig tail sensor with no mating connectors on the end of the pig tail, and therefore intended to be connected to terminal block connectors.
Figure 4A:
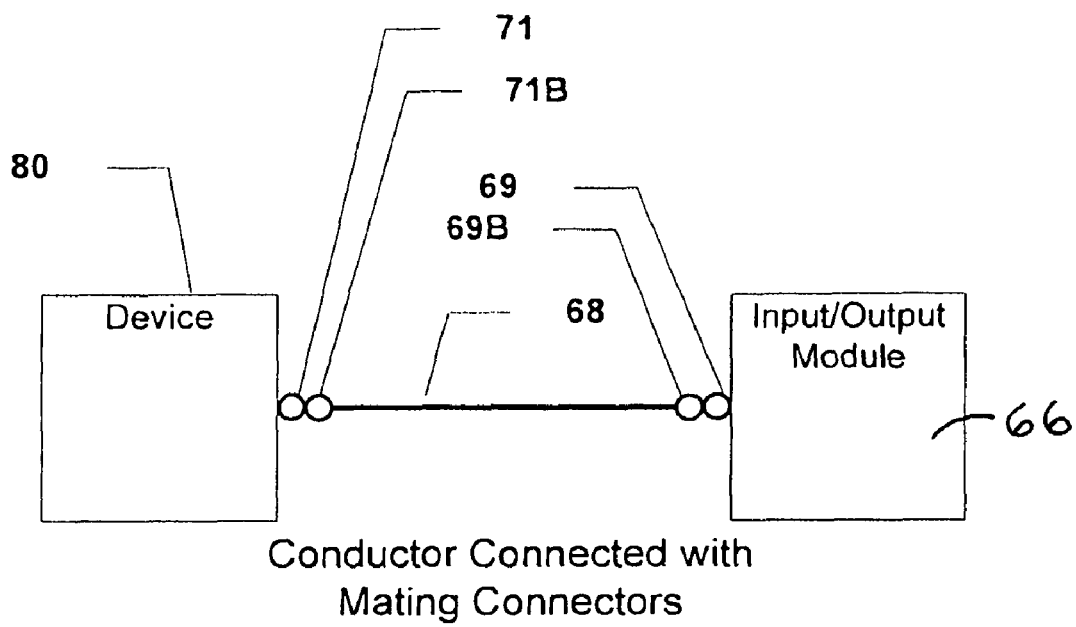
FIG. 4A is a schematic of a device connected to an input/output module employing mating connectors on both ends of the conductor.
Figure 4B:
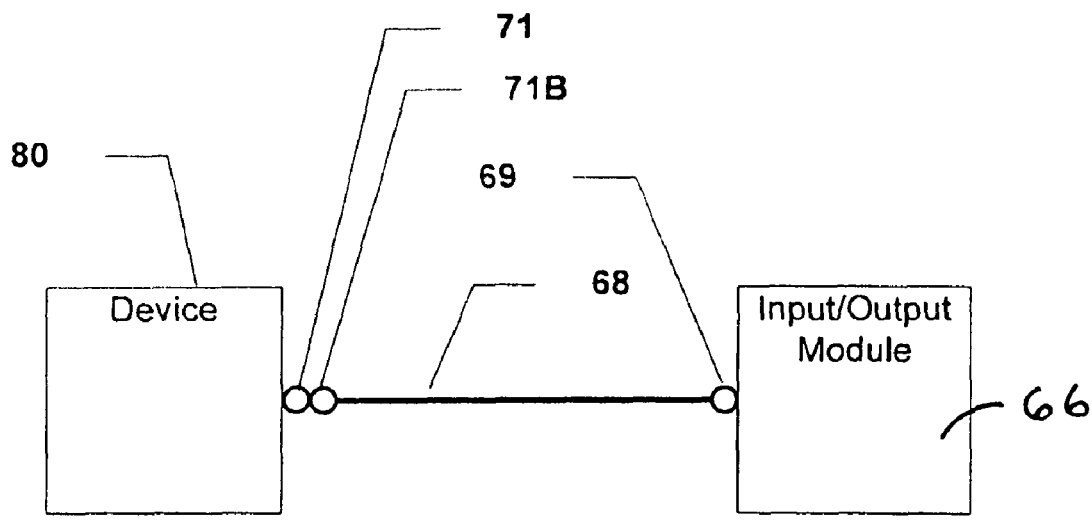
FIG. 4B is a schematic of a device connected to an input/output module employing a mating connector at the device-end of the conductor and no mating connector at the input/output module end of the conductor, therefore intended to be connected to a terminal block connector.
Figure 9:
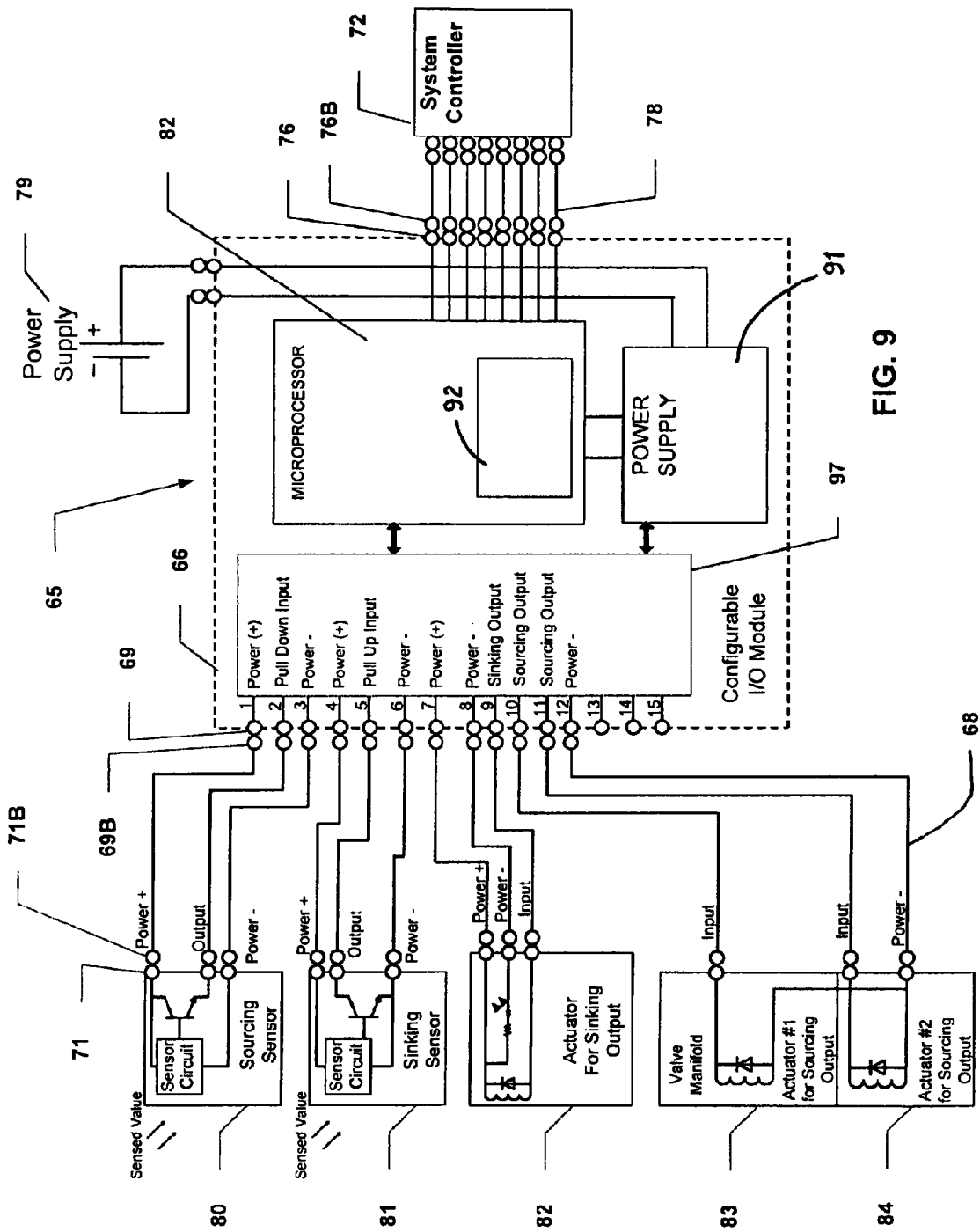
FIG. 9 is a schematic of a configurable input/output system connected to a sinking sensor, a sourcing sensor, an actuator intended to be connected to a sinking output circuit and an actuator intended to be connected to a sourcing output circuit, according to the invention.

In FIG. 9, a block diagram shows a configurable connectorized system including an input/output system 65 connecting sensors and actuators 80-84 to a system controller 72. Configurable input/output system 65 includes an input/output module 66, the module being one or more circuit boards optionally mounted in an enclosure or plugged into a backplane. The module 66 includes one or more device communication connectors 69. The device communication connectors 69 may be a simple terminal block connector to which a single conductor or a plug-type connector may be connected. The plug may hold one or multiple conductors. For clarity, FIG. 9 shows the most general case in which all of the device communication connectors 69 hold a single conductor. The conductors 68 interconnect the devices 80-84 to the configurable input/output module 66. The devices may contain device-end connectors 71 which may or may not be similar to the device communication connectors 69. The conductors 68 may optionally have affixed to them connectors 69B and 71B which mate with the respective input/output module device communication connectors 69 and device-end connectors 71, respectively. Alternatively, the conductors 68 have no connectors 69B and/or 71B and are connected directly to the device communication connectors 69 and/or the device-end connectors 71. Such direct connection could employ terminal block connectors, for example, as described above. The conductors 68 may be grouped into cables. See cable 68B in FIG. 3B and related discussion. All of the cables 68B are preferably identical, but the present invention also allows for cables 68B with differing numbers and configuration of conductors. The device communication connectors 69 and device-end connectors 71 may similarly be grouped so as to match the number of conductors of the cables. By so doing, an entire cable may be connected/disconnected from either a device or the input/output module or both.

In another alternative, no device-end connector 71 is employed at all, which results if, for example, any device 80-84 is manufactured with a pig tail arrangement where the conductors 68 are already attached to the device. In such a case, the pig tail may be connected directly to device communication connectors 69, which may be a terminal block. Alternatively, the pig tail may have connectors 69B attached to the ends of the conductors, and the connectors may be connected directly to the device communication connectors 69.

The connectors 69B and 71B may be attached to the conductors 68 by being crimped, soldered, welded, brazed or similarly affixed. Alternatively, the conductors may be directly clamped, for example using screw-driven or spring-type terminal blocks, thus obviating the need for one or both mating connectors 69B and 71B.

The configurable input/output module 66 includes a microprocessor 82, an internal power supply 91 and an interface apparatus 97. The internal power supply 91 provides power to the interface apparatus 97, thus enabling power to be supplied from the input/output module 66 to devices 80-84. The internal power supply 97 also provides power for the operation of all components of the module 66. The internal power supply 91 is connected to an external power supply 79. The interface apparatus 97 is described in detail below, with reference to FIG. 11. The microprocessor 82 is programmable for effecting a particular directing of a signal between the configurable input/output module 66 and devices 80-84, and between the module 66 and a system controller 72. The microprocessor contains a buffer memory 92. Controller communication connectors 76 provide connection to a network connection 78 (preferably Ethernet) for communication between the module 66 and the system controller 72. The network connection 78 may be a cable with standard connectors 76B which allow the cable to be readily attached to and detached from the input/output module 66. The network connection 78 may instead be a backplane connector, for example the module 66 may be plugged into a backplane of a PLC or an embedded controller, or the module may function as an embedded controller. The network connection 78 may also utilize wireless technology without departing from the essence of the invention. The system controller 72 is often used to coordinate multiple configurable input/output modules 66. However, the configurable I/O module 66 may operate without connection to the system controller 72. Without departing from the teaching of the present invention, a configurable input/output module 66 may: act as a so-called embedded controller; be a circuit board which is a part of a larger system; or function as the system controller by itself.

Figure 5:
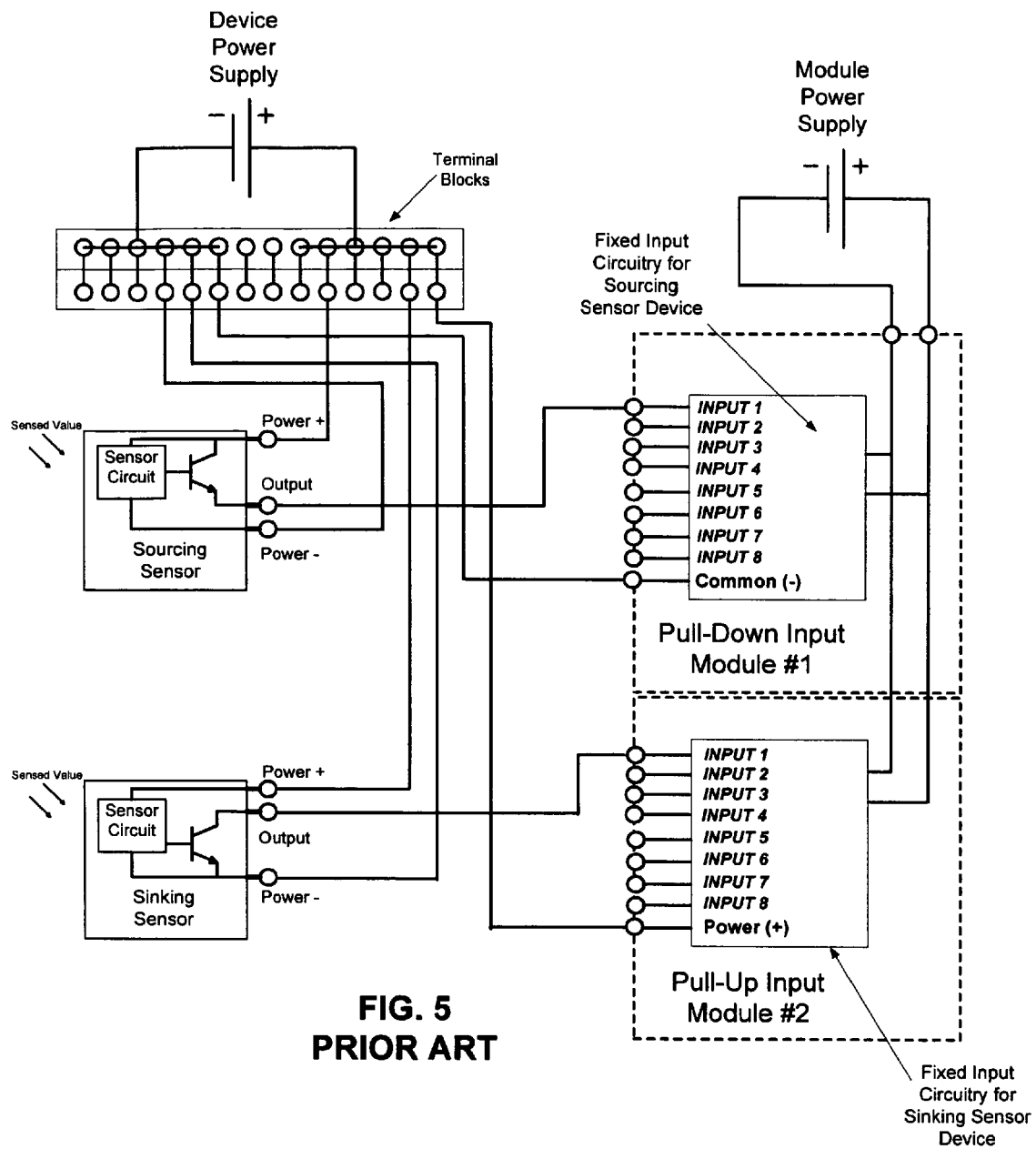
FIG. 5 is a schematic of a prior art system of two input modules connected to two sensors, one sinking and one sourcing.
Figure 7:
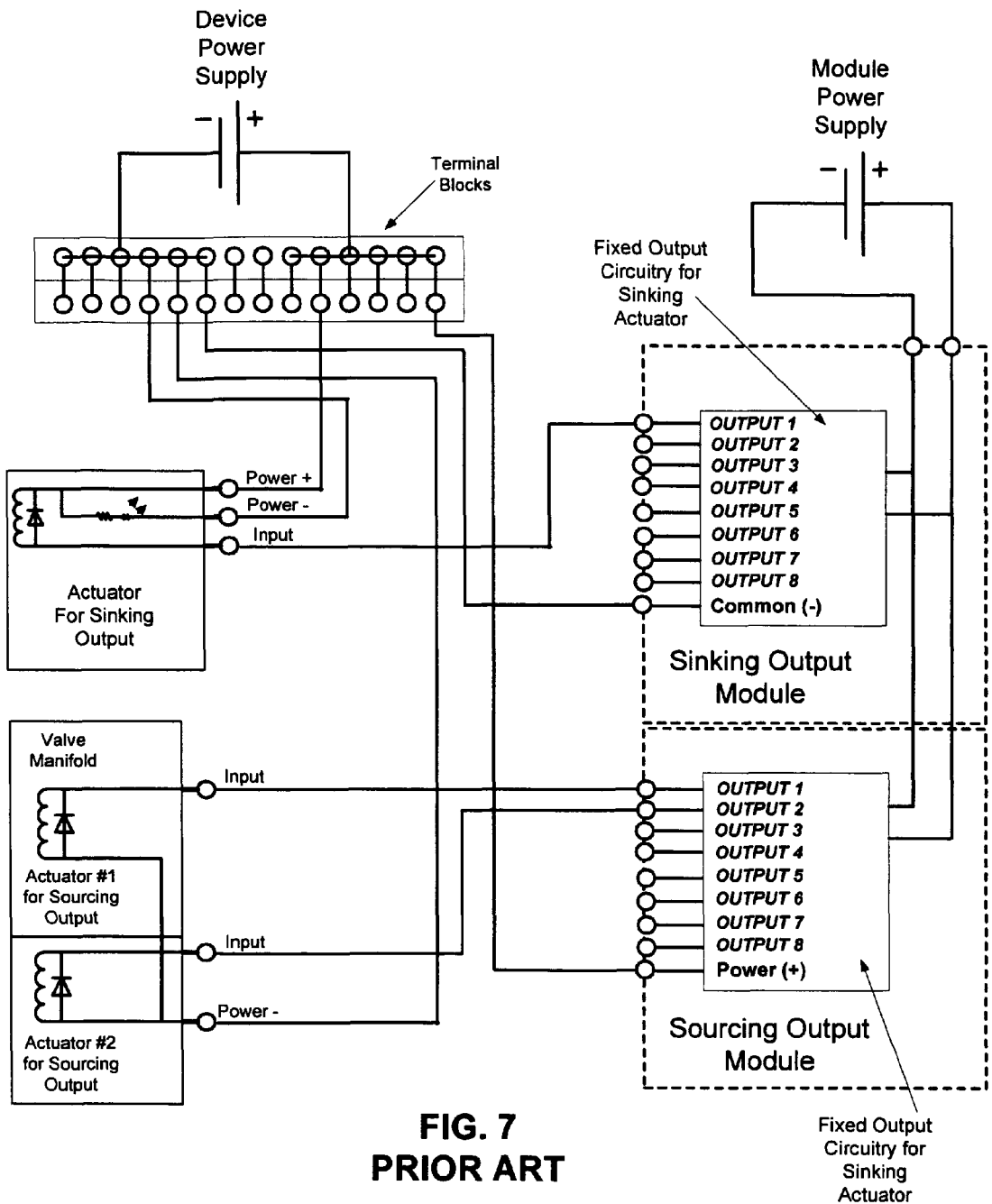
FIG. 7 is a schematic of a prior art system of two output modules connected to two actuators, one intended to connect to a sinking output circuit and one intended to connect to a sourcing output circuit.

Referring to FIG. 9, four different sensors and actuators are shown connected to a single configurable input/output module of the present invention. Specifically, a sourcing sensor 80, a sinking sensor 81, and two actuator types, one designed to be driven by a sourcing output circuit (see 83 & 84) and one designed to be driven by a sinking output circuit (see 82) are connected to the configurable input/output module 66. In contrast, an equivalent prior art system will require four different input/output modules. (FIG. 7 illustrates a prior art system with three actuators and FIG. 5 shows a prior art system with two sensors, from which it can be appreciated that an equivalent prior art system for four different sensors and actuators will require four different input/output modules.) The present invention accomplishes this requirement with a single, configurable input/output module 66. In addition, the prior art systems do not supply power from input/output modules, whereas the present invention employs a configurable I/O connection that supplies power and a ground return. Finally, the prior art systems poorly utilize the circuits of the four different input and output modules, whereas the present invention utilizes all necessary connections of the configurable input/output module. It should be noted that in the system shown in FIG. 9 three configurable input/output channels are not required for this set of sensors and actuators. These three channels are therefore available for additional sensors and actuators, should they be needed in the future.

FIG. 9 demonstrates the superiority of the present invention over the prior art. With the present invention, far fewer connections are required to achieve the same utility as the prior art. In addition, efficient utilization of the input/output module of the present invention is achieved, making distributed control architectures more attractive.

Figure 6:
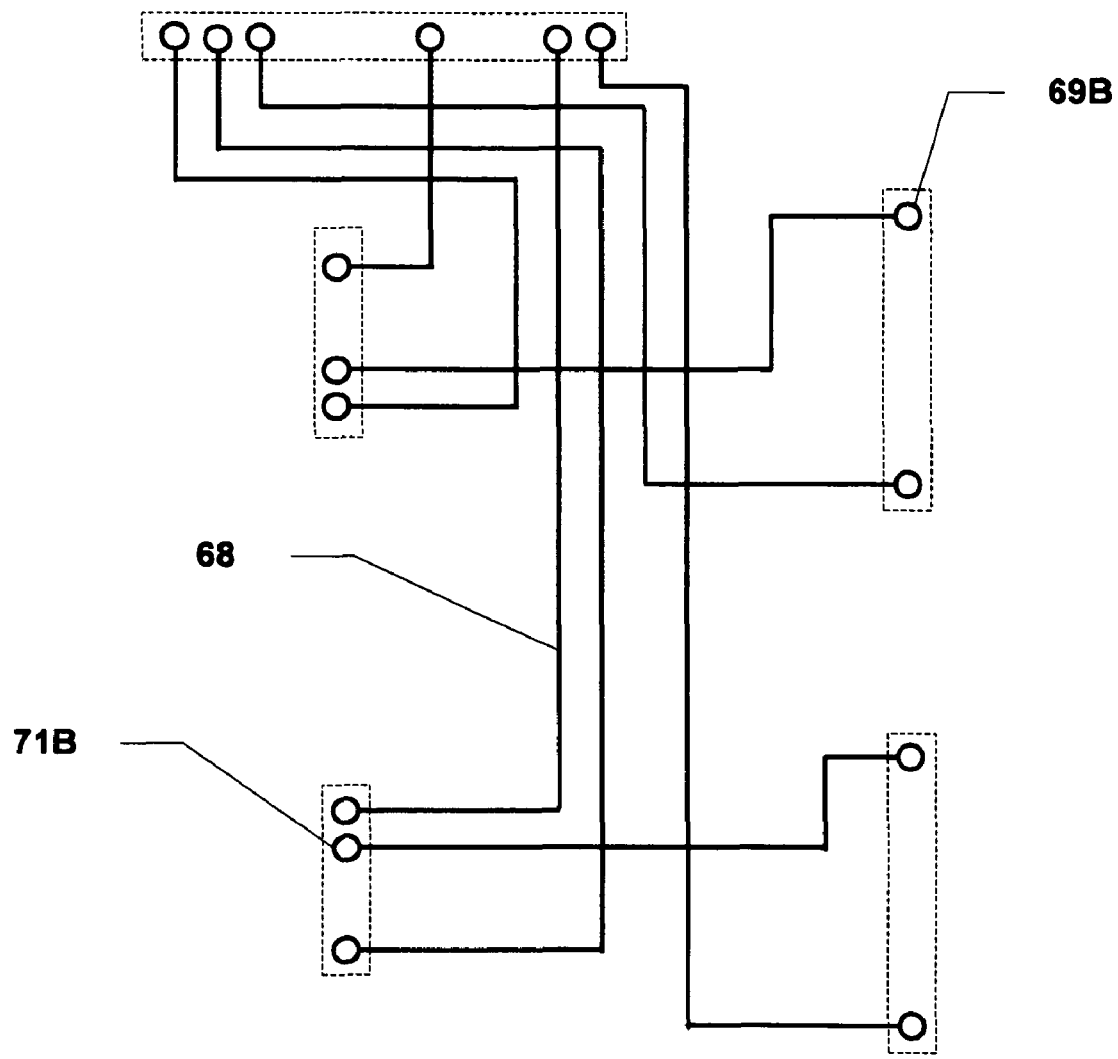
FIG. 6 shows the interconnection wiring of the system of FIG. 5.
Figure 8:
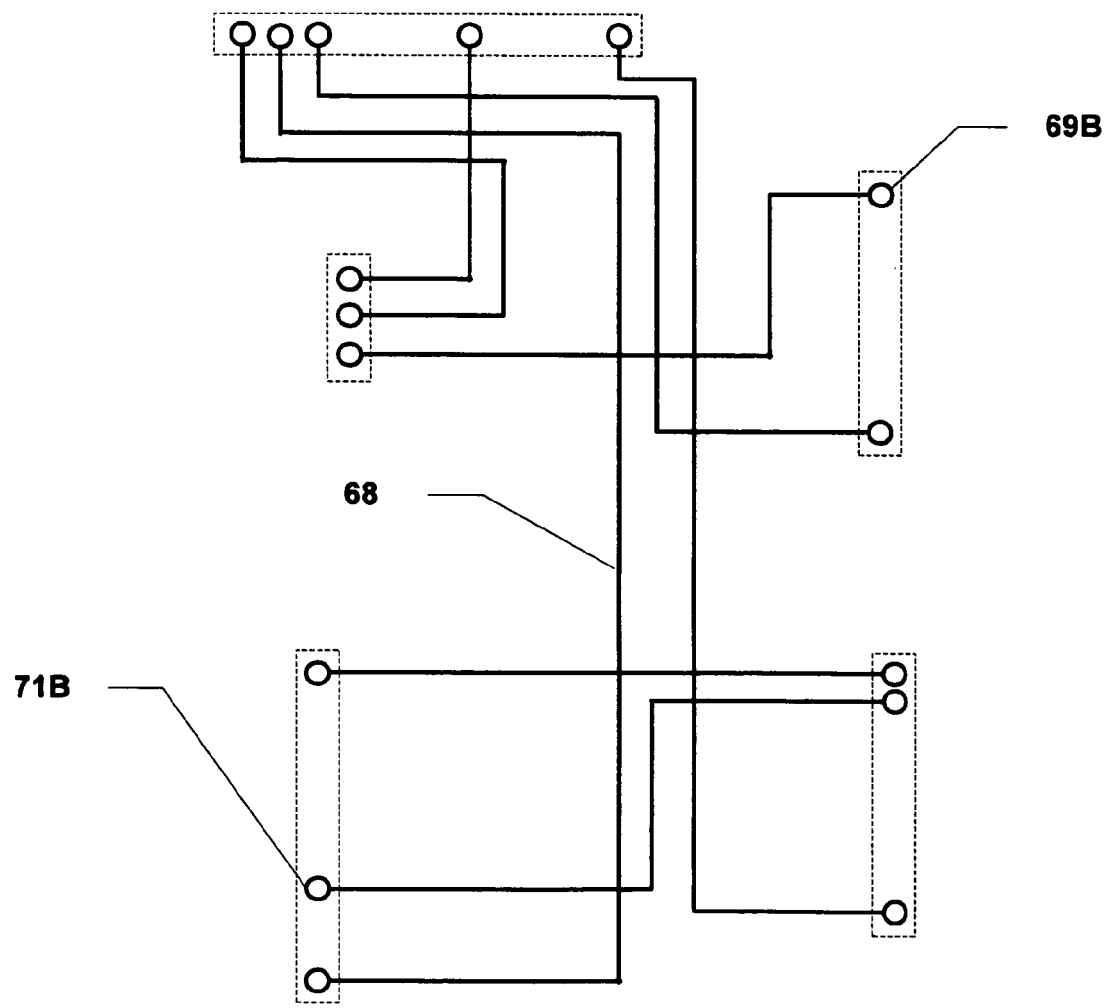
FIG. 8 shows the interconnection wiring of the system of FIG. 7.
Figure 10:
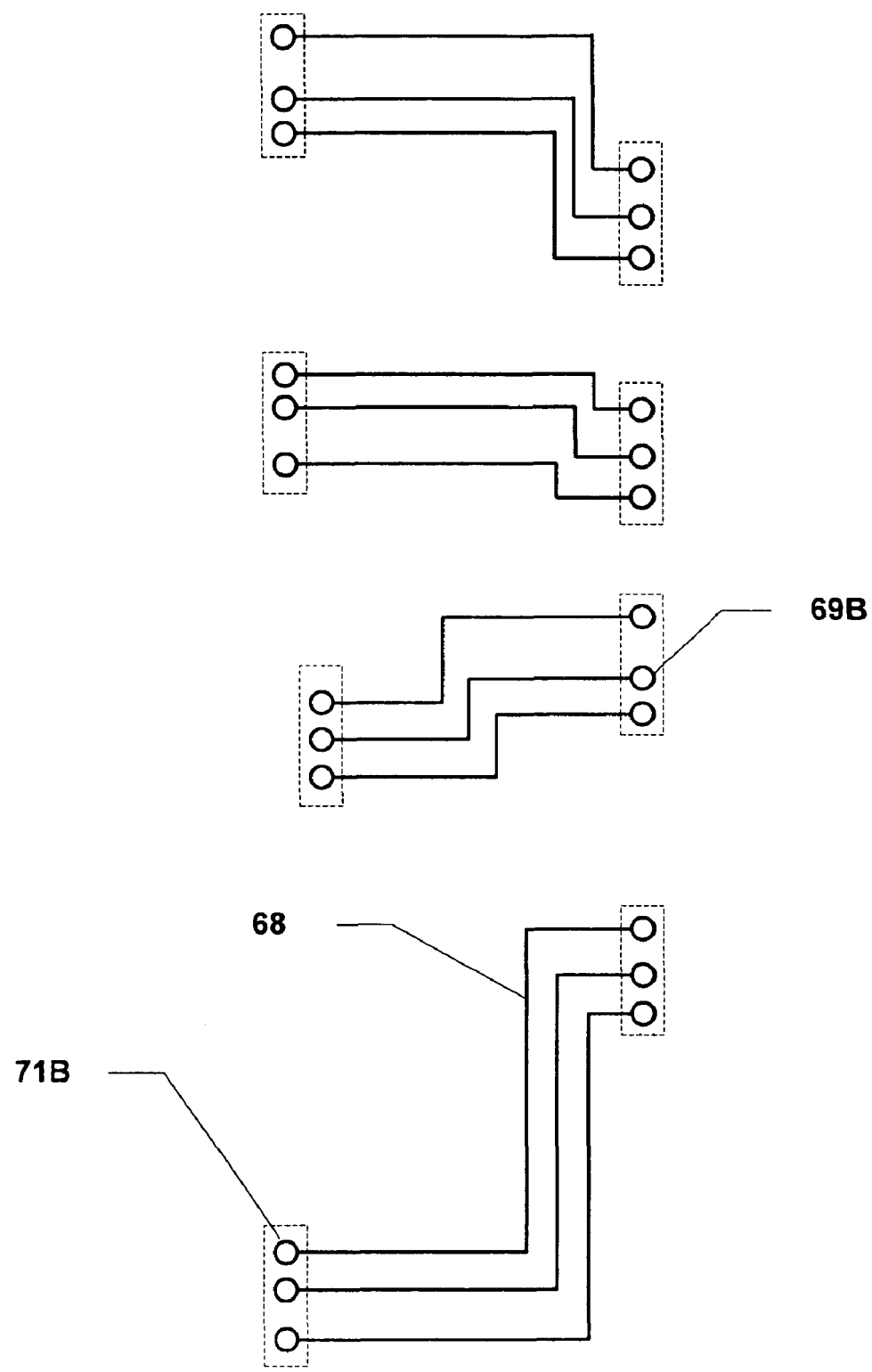
FIG. 10 shows the interconnection wiring of the system of FIG. 9.

FIG. 10 shows the wiring layout for the system of FIG. 9. The conductors are shown in four groups corresponding to the four devices. The conductors in each group may conveniently be combined into a cable, thus four identical cables can be used. FIG. 10 depicts another benefit of the configurable input/output module of the invention. Whereas the wiring of the prior art was necessarily a complex wire harness that defied attempts at simplification, the wiring of the present invention is efficient and simple, for example, consisting of separate, simple cables for each of the sensors and actuators. The nature of the configurable, connectorized input/output module generally allows standard, identical cable sets to be used because the desired signals can be directed onto the desired contacts. This cabling simplification tips the balance between hand-wired terminal block connectors and cables decidedly in the favor of standard cables. Therefore, the present invention reduces the cost and complexity of wiring a control system. Comparing the prior art, FIGS. 6 and 8, with the present invention, FIG. 10, clearly shows how the simplified wire pattern of the present invention encourages cabled, connectorized wiring systems. Being able to use four identical cables greatly simplifies connecting sensors and actuators to the configurable input/output module.

Furthermore, comparing FIGS. 9 and 10 with FIGS. 5-8, it is clear that the present invention significantly improves the utilization of input/output channels as well as reducing the space required for wiring. Both of these benefits lessen the need to employ centralized control systems, instead making the long-sought distributed control system architectures practical.

The present invention facilitates the use of standard cables for connecting to sensors and actuators. However, the use of hand-wired, single-conductor terminal block connectors is not precluded since this configuration is the simplest of standard cable connections. Some users of input/output systems prefer hand-wired, single-conductor systems. The present invention significantly simplifies such systems and results in much better utilization of the input/output modules.

Figure 11:
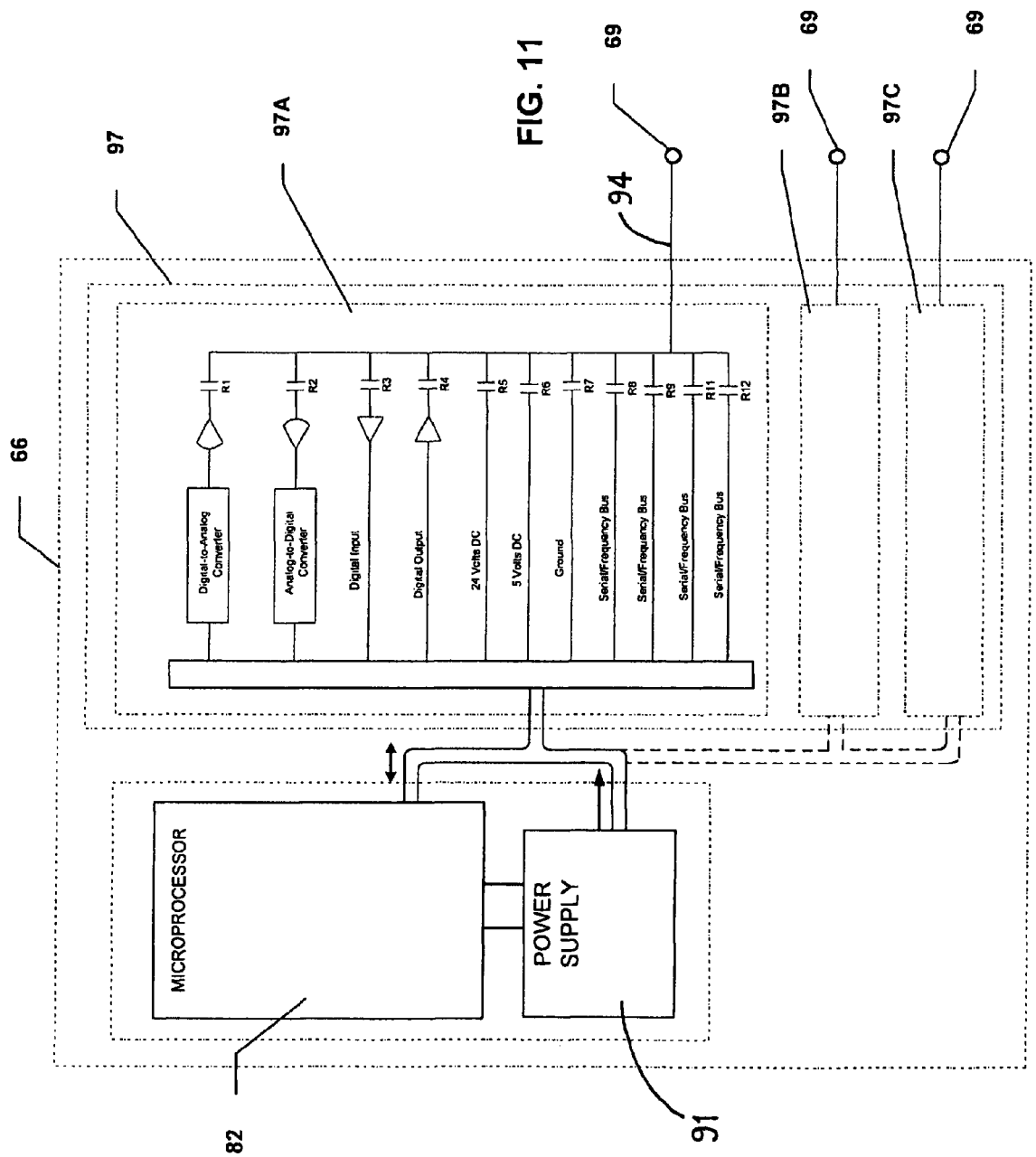
FIG. 11 is a schematic of the configurable interface apparatus, according to the invention.

FIG. 11 shows input/output module 66 with more detail of the interface apparatus 97. The configurable input/output module 66 may contain any number of interface apparatus 97A, 97B, 97C . . . . Each interface apparatus is connected to one device connector 69 and optionally through an internal cross point switch to another interface apparatus. (See FIG. 12 and related description.) Each interface apparatus contains any number of interconnection apparatus, each with a relay. In the particular embodiment shown, there are 12 interconnection apparatus and corresponding relays R1-R12. The interface apparatus 97A is capable of routing any of a plurality of signals and connecting them to the device connector 69. FIG. 11 is highly stylized and is intended to convey the essence of the invention. The interface apparatus, shown in FIG. 11 to comprise interconnection apparatus and relays R1 to R12, are realized with transistors in preferred embodiments.

The interface apparatus, including interconnection apparatus such as those illustrated in FIG. 11, may be configured as an integrated circuit (IC). The IC is repeated within the I/O module 66 for each device connector 69. Thus, if there are 25 device connectors 69, then 25 ICs would be employed. The module 66 can contain any number of ICs, just as any module may contain any number of device connectors 69. Another embodiment may employ a different IC architecture in which multiple device connectors 69 are handled in each IC or multiple ICs are used to handle one or more device connectors. The result of using an IC is a dramatic reduction in the size and cost of building a module 66 by virtue of the miniaturization afforded by modern semiconductor processes.

Figure 12:
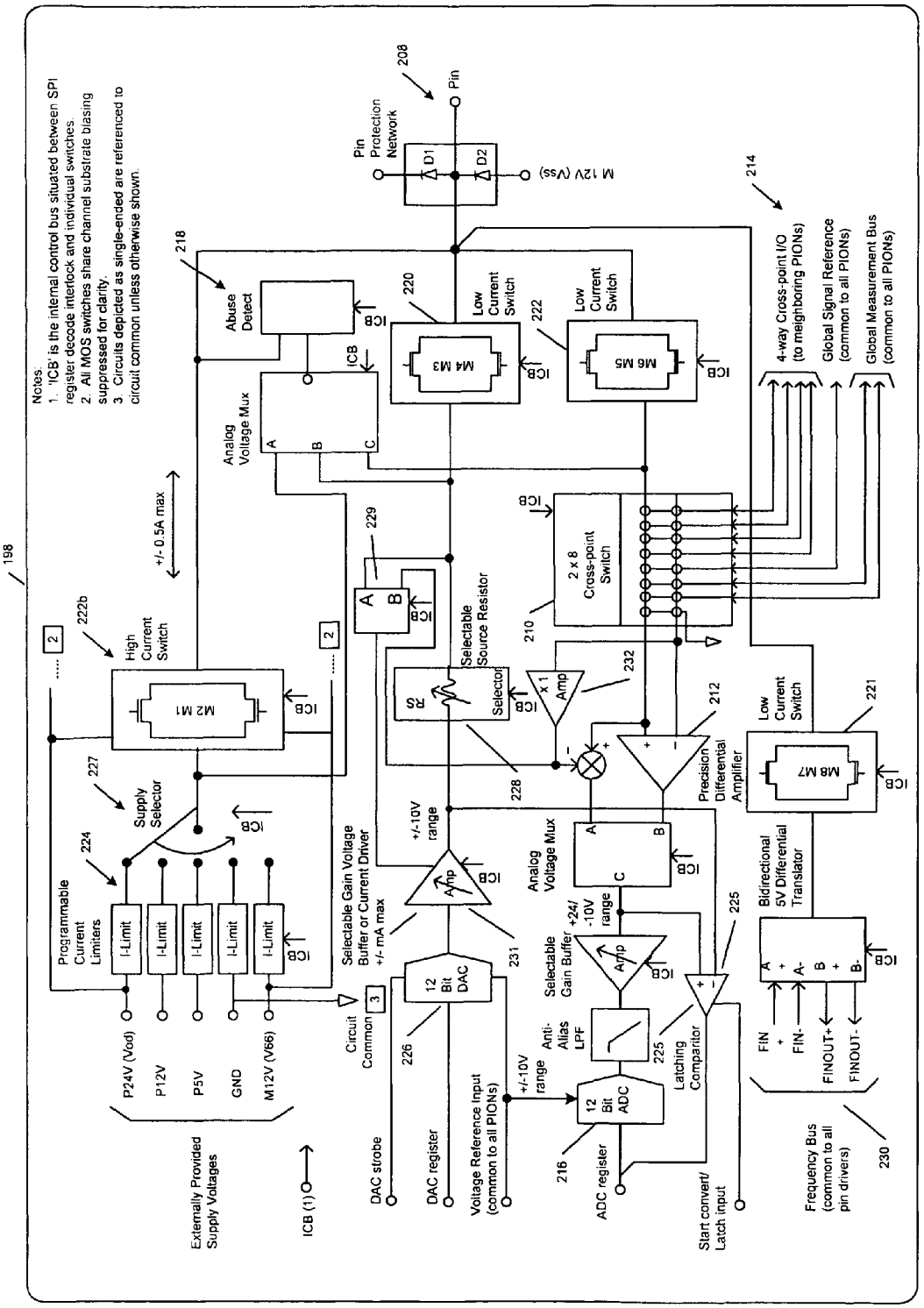
FIG. 12 is a schematic of an integrated circuit performing the function of the configurable interface apparatus of the invention.

FIG. 12 is a block diagram of an integrated circuit capable of realizing the interface apparatus, 97A. The integrated circuit 198 has been specifically designed to serve the role of the interconnection apparatus, thus it may be referred to as an Application Specific Integrated Circuit (ASIC). This ASIC is specifically designed to provide the functionality of the interconnection apparatus. At some point in the future, such an ASIC could become a standard product from an integrated circuit vendor. Therefore the term ASIC, as used herein, includes a standard integrated circuit designed to function as the interface apparatus. Furthermore, the term integrated circuit (IC), as it is used herein is intended to cover the following range of devices: ASICs, hybrid ICs, low temperature co-fired ceramic (LTCC) hybrid ICs, multi-chip modules (MCMs) and system in a package (SiP) devices. Hybrid ICs are miniaturized electronic circuits that provide the same functionality as a (monolithic) IC. MCMs comprise at least two ICs; the interface apparatus of the present invention may be realized by a MCM where the required functionalities are divided between multiple ICs. A SiP, also known as a Chip Stack MCM is a number of ICs enclosed in a single package or module. A SiP can be utilized in the current invention similarly to a MCM. In theory, programmable logic devices might be used to realize the interface apparatus of the present invention. However, currently available programmable logic devices, such as field programmable gate arrays (FPGAs), have a number of functional limitations that make their use undesirable—for example an FPGA cannot route power or ground to a given pin.

FIG. 12 depicts a block diagram of a pin driver ASIC 198. When connected to the microprocessor 82 by a serial communication bus 206 such as an SPI interface, the microprocessor 82 of FIG. 11 can command the ASIC 198 to perform the functions of the circuits of interconnection apparatus 97A. Although the circuitry of FIG. 12 appears different from the interconnection apparatus 97A, the ASIC 198 is capable of performing the same or similar required functions. Whereas FIG. 11 is a somewhat idealized diagram intended to convey the essence of the invention, FIG. 12 contains more of the circuit elements that one would place inside an ASIC. Nonetheless, FIG. 12 implements all the circuit elements of FIG. 11. For example, FIG. 11 shows a digital-to-analog converter (D/A or DAC) connectable to the device communication connector 69. In FIG. 12, the digital-to-analog converter 226 is connected to the output pin 208 via the switch 220. The present invention also includes other circuit arrangements for an ASIC 198 for the same or similar purpose. Those skilled in the art will know how to design various such circuitry, and these are to be included in the present invention.

Exemplary features of the ASIC of FIG. 12 will now be briefly described. Power may be applied to pin 208 by closing high current switch 222*b* and setting the supply selector 227 to any of the available power supply voltages such as 24-volts, 12-volts, 5-volts, ground or negative 12-volts.

The ASIC can measure the voltage on pin 208 by closing the low current switch 222 and reading the voltage converted by the analog-to-digital converter 216.

A thermocouple temperature sensor can be directly connected to ASIC 198 at point/pin 208, wherein the sensor produces a very low voltage signal. A cross-point switch 210 allows a precision differential amplifier 212 to connect to both leads of the thermocouple, one lead of the thermocouple being connected to the node/pin 208 connected to a pin of a connector 69 (FIG. 11), and the second lead of the thermocouple connected to another pin of the connector 69, which is connected to a 4-way cross-point I/O 214 connector. The cross-point switch 210 therefore allows two adjacent pins of a connector 69 to be connected to the same analog-to-digital converter 216 via a differential amplifier 212.

ASIC 198 has the ability to measure the amount of current flowing in or out of the node 208 labeled "Pin" in FIG. 12. The pin driver circuit 198 in this case uses its A/D converter 216 to measure current flowing into or out of the pin node 208, thereby enabling the detection of excessive current, or detecting whether a device connected to the Pin node 208 is functioning or wired correctly.

ASIC 198 also has the ability to monitor the current flow into and out of the pin node 208 to unilaterally disconnect the circuit 198, thereby protecting the ASIC 198 from damage from short circuits or other potentially damaging conditions. The ASIC 198 employs a so-called "abuse detect circuit" 218 to monitor rapid changes in current that could potentially damage the ASIC 198. Low current switches 220, 221 and 222 and high current switch 222b respond to the abuse detect circuit 218 to disconnect the pin 208.

The ASIC 198 abuse detect circuit 218 has the ability to establish a current limit for the pin 208, the current limit being programmatically set by the microprocessor 82. This is indicated by selections 224.

The ASIC 198 can measure the voltage at the pin node 208 in order to allow the microprocessor 82 to determine the state of a digital input connected to the pin node. The threshold of a digital input can thereby be programmed rather than being fixed in hardware. The threshold of the digital input is set by the microprocessor 82 using the digital-to-analog converter 226. The output of the digital-to-analog converter 226 is applied to one side of a latching comparator 225. The other input to the latching comparator 225 is routed from the pin 208 and represents the digital input. Therefore, when the voltage of the digital input on the pin 208 crosses the threshold set by the digital-to-analog converter, the microprocessor 82 is able to determine the change in the input and thus deduce that the digital input has changed state.

The ASIC 198 can receive or produce frequency signals. If a serial communication device, for example a printer, is connected to pin 208, then the frequency signals can be routed through the low current switch 221 and thence to a universal asynchronous receiver transmitter (UART) or similar circuit element (not shown) that can interpret the frequency information. All of the ASICs 198 in a module 66 (see FIG. 11) can route the frequency information to one of four wires that make up the frequency bus 230. By employing the frequency bus 230, it is possible for the module 66 to receive and transmit frequency signals configured as either single-ended or differential. Such serial electrical standards as RS-422 provide for differential serial information.

The ASIC 198 can produce a current source at the pin node, the current source being a standard method of connecting various industrial control devices. The ASIC 198 can produce signals varying over the standard 4-20 mA and 0-20 mA range. This current source means is accomplished by the microprocessor 82 as it causes the digital-to-analog converter 226 to produce a voltage which is routed to a Selectable Gain Voltage Buffer or Current Driver 231 and then through a selectable source resistor 227, the selectable source resistor 227 being set to the appropriate resistance, by the microprocessor 82, to achieve the desired output current. The current is regulated by the Selectable Gain Voltage Buffer or Current Driver 231 using feedback through the analog switch 229 using path A.

The ASIC 198 can measure a current signal presented at the pin node, the current signal being produced by various industrial control devices. The ASIC 198 can measure signals varying over the standard 4-20 mA and 0-20 mA ranges. This current measurement means is accomplished by the microprocessor 82 as it causes the selectable gain voltage buffer 231 to produce a convenient voltage such as zero volts at its output terminal. At the same time, the microprocessor 82 causes the selectable source resistor 228 to present a resistance to the path of current from the industrial control device and its current output. This current enters the ASIC 198 via the pin 208. The imposed voltage on one side of a known resistance will cause the unknown current from the external device to produce a voltage on the pin 208 which is then measured via the analog-to-digital converter 216 through the low current switch 222. The microprocessor 82 uses Ohm's Law to solve for the unknown current being generated by the industrial control device.

Other enhancements of the present invention include the ability of the module 66 to perform independent control of devices connected to the module 66. If, for example, a thermocouple or other temperature sensor is connected to the module 66 along with a heater, then the microprocessor 82 can read the temperature sensor, and activate the heater in such a manner that a desired temperature is achieved. The heater usually employs an amplifier (for example a relay) which converts the low-level output of the module 66 into a high-power output capable of driving a heater. The module 66 can thereby perform closed loop control. In such a case, the thermocouple would be connected to two adjacent pins 208 configured as inputs, while the heater would be connected to two pins 208, the heater pins being configured as outputs. In operation, the microprocessor 82 would measure the voltage of the temperature sensor as described above. The microprocessor 82 would apply the desired temperature using known control algorithms to the measured temperature and develop an actuation signal also using the accepted methods. The microprocessor would then actuate the heater either with a continuously variable analog signal or via a pulse width modulated (PWM) on/off signal. Thus, independent control of devices connected to the module 66 is achieved.

The ASIC 198 includes functions as described above in reference to the interface apparatus 97. For example, an ASIC 198 can include an interconnection apparatus including a digital-to-analog converter 226, wherein the microprocessor 82 is programmable to direct the reception of a digital signal from the microprocessor 82 and cause the signal to be converted by the digital-to-analog converter 226 to an analog signal, and to place a copy of the analog signal on the pin 208. See FIGS. 11 and 12.

The ASIC 198 can also include an interconnection apparatus including an analog-to-digital converter 216, and wherein the microprocessor 82 is programmable to detect an analog signal on any selected contact 69 and cause the analog-to-digital converter 216 to convert the signal to a digital signal and output a copy of the digital signal to the microprocessor 82.

The ASIC 198 can also include a supply selector 227, and a high current switch 222b positioned between the selector 227 and the pin 208. The microprocessor 82 is programmable to operate a supply selector 227 to cause a power supply voltage to be connected to a first contact 69, and to cause a power supply return to be connected to a second contact 69.

Referring to FIG. 12, there is a 2×8 cross-point switch 210, that serves to connect a sensor to two adjacent pins 208 which are in turn connected to two adjacent device communication connectors 69. The cross-point switch 210 allows a sensor such as a thermocouple to be connected to a precision differential amplifier 212. The precision differential amplifier 212 may be connected via the low current switch 222 and the 2×8 cross-point switch 210 to the 4-way cross-point I/O 214 and then to another 4-way cross-point I/O 214 on an adjacent integrated circuit 19 (the integrated circuit for an adjacent contact 69).

Referring to FIGS. 9 and 11, the microprocessor 82 is generally configured/programmed by a controller 72 to receive instruction from the controller as required to sense a particular selected one of devices 80-81 or actuate one of devices 82-84 and provide the corresponding data to the system controller. The microprocessor 82 is also programmed/directed by the controller 72 to cause a particular signal to be applied to any selected one or more contacts 69 and thereby corresponding conductors 68. In addition, the microprocessor 82 is programmed to respond to direction to send a selected signal type from one or more of devices 80-84 to the system controller 72. In other words, the microprocessor controls the configuration of the interface apparatus 97 and generally the microprocessor is controlled by the system controller. Alternatively, the interface apparatus can be configured in response to a message stored in the memory of the microprocessor 82 of the module 66. In another alternative method, the interface apparatus can be configured in response to a set of jumper blocks installed on the module circuit board, wherein inserting or removing the jumper blocks determines the configuration.

In preferred embodiments, the microprocessor 82 has an embedded web server. A personal computer may be connected to the system 65 using an Ethernet cable or a wireless communication device and then to the Internet. Here the personal computer may also be a system controller. The embedded web server provides configuration pages for each device connected to the module 66. The user then uses a mouse, or other keyboard inputs, to configure the device function and assign input/output pins. The user may simply drag and drop icons on the configuration page to determine a specific interconnection apparatus for each of the contacts.

As an example of the operation of the system 65, the microprocessor 82 may be programmed to recognize particular input data, included for example in an Ethernet packet on network cable 78 containing instructions to transmit the data as an analog signal on a particular line 94 to a particular one of devices 80-84. The programming in this case would instruct the microprocessor to direct/convert the data through apparatus having a digital to analog converter in interface apparatus 97. Facility for making this connection is symbolized by relay "R1" which would be activated to make the required connection. As another example, if line 94 were to carry 5 volts to the one of devices 80-84, the microprocessor 82 would be programmed to respond to a signal from the controller 72 to activate relay R6. In this manner, the system 65 allows communication of a selected variety through any line such as 94, and application of any one of a variety of signals to be sent to any selected line such as 94 and thence to a corresponding device.

The circuit switching apparatus (R1-R12) are shown diagrammatically as electromechanical relays. In one embodiment, this switching apparatus is realized in a semiconductor circuit. (See FIG. 12 and related description.) A semiconductor circuit can be realized far less expensively and can act faster than an electromechanical relay circuit. An electromechanical relay is used in order to show the essence of the invention.

Figure 13:
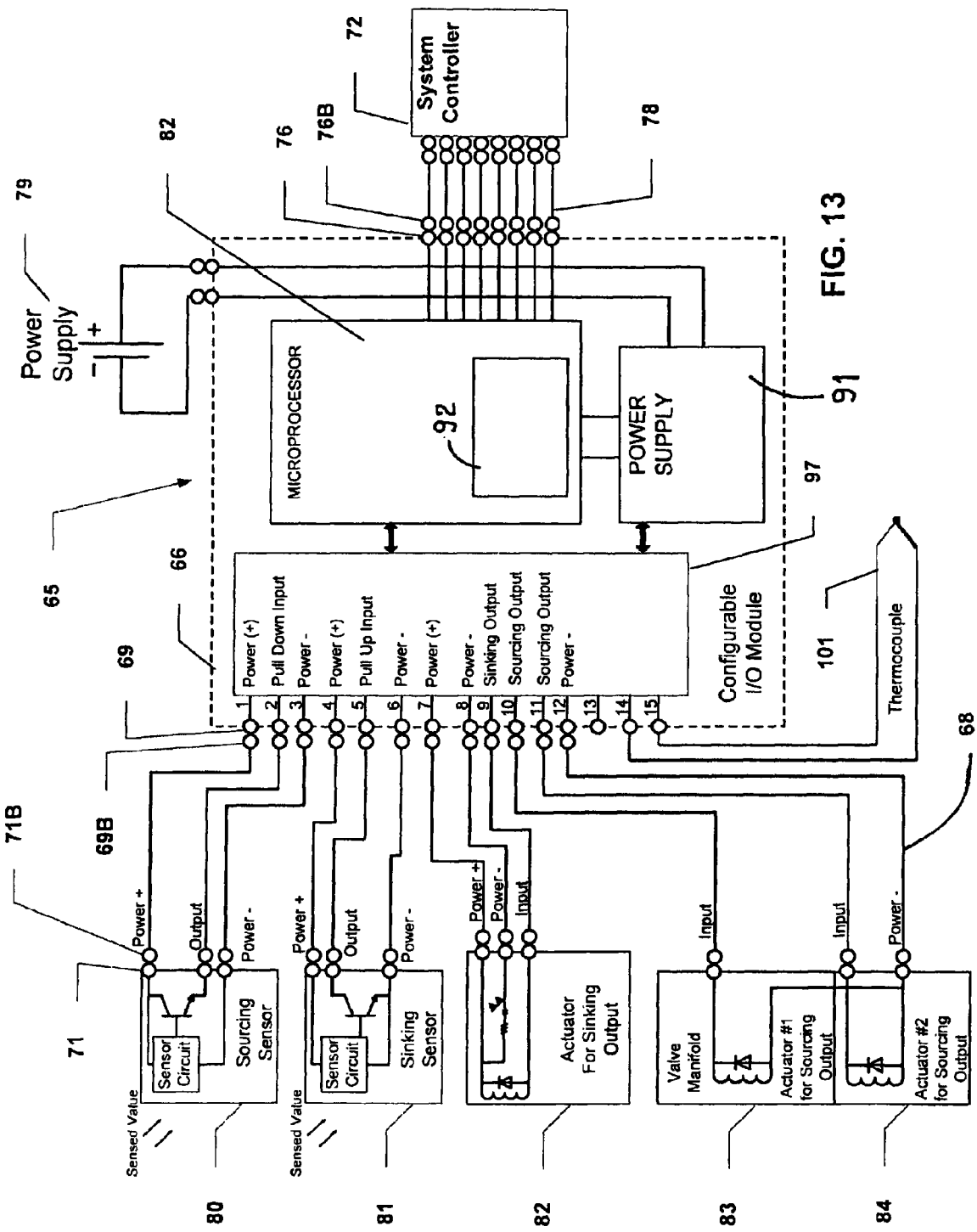
FIG. 13 is a schematic of a configurable input/output system as in FIG. 9 with the addition of a thermocouple connected in such a manner as to measure the differential voltage across the thermocouple, according to the invention.

FIG. 13 further demonstrates the advantages of configurable adjacent connections of the present invention. FIG. 13 shows a thermocouple 101 added to the system of FIG. 9. As discussed above, the embodiment shown in FIG. 9 is more efficient than the prior art in terms of channels used. Three channels remain unused in the system shown in FIG. 9, specifically device communication connectors numbers 13, 14 and 15. In FIG. 13, the thermocouple, a type of temperature sensor, is connected to communication connectors 14 and 15. In order to measure the small thermocouple voltage accurately, a precision differential amplifier 212 is connected to the thermocouple using the cross-point switch 210. See FIG. 12.

FIG. 13 illustrates the ability of a single configurable input/output module 66 to make connections to sourcing, sinking, digital and analog sensors and actuators simultaneously. Thus making efficient use of the available channels on the I/O module. In contrast, a fixed-configuration prior art input/output module cannot accommodate more than one of these disparate devices. (See FIGS. 5 & 7.)

While a particular embodiment of the present invention has been shown and described, it will be obvious to those skilled in the art that changes and modifications may be made without departing from the spirit of the present invention, and therefore the appended claims are to include these changes and alterations as follow within the true spirit and scope of the present invention.

What is claimed is:

1. A configurable connectorized system comprising:
   a module including:
   (i) a device communication connector apparatus for connecting at least one conductor between said module and at least one device; and
   (ii) interface apparatus for causing said module to place any of a plurality of signals on any of a plurality of contacts of said device communication connector apparatus, wherein said interface apparatus includes at least one electronic integrated circuit providing a selectable interconnection apparatus to a particular one of said contacts, wherein said interface apparatus is configurable by a user of said system and wherein said electronic integrated circuit is a hybrid integrated circuit.

2. A system as recited in claim 1 wherein said hybrid integrated circuit is a low temperature co-fired ceramic hybrid integrated circuit.

3. A configurable connectorized system comprising:
   a module including:
   (i) a device communication connector apparatus for connecting at least one conductor between said module and at least one device; and
   (ii) interface apparatus for causing said module to place any of a plurality of signals on any of a plurality of contacts of said device communication connector apparatus, wherein said interface apparatus includes at least one electronic integrated circuit providing a selectable interconnection apparatus to a particular one of said contacts, wherein said interlace apparatus is configurable by a user of said system and further comprising a network connection.

4. A system as recited in claim 3 wherein said network connection is Ethernet.

5. A system as recited in claim 3 wherein said network connection is a wireless connection.

6. A configurable connectorized system comprising:
   a module including:
   (i) a device communication connector apparatus for connecting at least one conductor between said module and at least one device; and
   (ii) interface apparatus for causing said module to place any of a plurality of signals on any of a plurality of contacts of said device communication connector apparatus, wherein said interface apparatus includes at least one electronic integrated circuit providing a selectable interconnection apparatus to a particular one of said contacts, wherein said interface apparatus is configurable by a user of said system and wherein said interface apparatus is responsive to communications over a network for causing said module to place any of said plurality of signals on any of said plurality of contacts of said device communication connector.

7. A system as recited in claim 6 wherein said network is the Internet.

8. A configurable connectorized system comprising:
a module including:
(i) a device communication connector apparatus for connecting at least one conductor between said module and at least one device; and
(ii) interface apparatus for causing said module to place any of a plurality of signals on any of a plurality of contacts of said device communication connector apparatus, wherein said interface apparatus includes at least one electronic integrated circuit providing a selectable interconnection apparatus to a particular one of said contacts, wherein said interface apparatus is configurable by a user of said system and wherein said interface apparatus is responsive to a configuration of jumper blocks for causing said module to place any of said plurality of signals on any of said plurality of contacts of said device communication connector.

9. A configurable connectorized system comprising:
a module including:
(i) a device communication connector apparatus for connecting at least one conductor between said module and at least one device; and
(ii) interface apparatus for causing said module to place any of a plurality of signals on any of a plurality of contacts of said device communication connector apparatus, wherein said interface apparatus includes at least one electronic integrated circuit providing a selectable interconnection apparatus to a particular one of said contacts, wherein said interface apparatus is configurable by a user of said system and wherein said interface apparatus is responsive to data stored in memory of said module for causing said module to place any of said plurality of signals on any of said plurality of contacts of said device communication connector.

10. A configurable connectorized system comprising:
a module including:
(i) a device communication connector apparatus for connecting at least one conductor between said module and at least one device, and
(ii) interface apparatus for causing said module to place any of a plurality of signals on any of a plurality of contacts of said device communication connector apparatus, wherein said interface apparatus includes at least one electronic integrated circuit providing a selectable interconnection apparatus to a particular one of said contacts, wherein said interface apparatus is configurable by a user of said system and wherein said interface apparatus is configured to apply input signals from two of said contacts to a differential amplifier, whereby a differential voltage is measured.

11. A method of configuring input/output channels on a configurable connectorized system, said system comprising a module including (i) a device communication connector apparatus with a plurality of contacts and (ii) an interface apparatus including at least one electronic integrated circuit providing a selectable interconnection apparatus to a corresponding at least one of said contacts, said method comprising the step of commanding said interface apparatus to place any of a plurality of signals on any of said plurality of contacts of said device communication connector apparatus, wherein said commanding step includes a system controller commanding communicating instructions to said module to determine the configuration of said signals on said contacts.

12. A method of configuring input/output channels on a configurable connectorized system, said system comprising a module including (i) a device communication connector apparatus with a plurality of contacts and (ii) an interface apparatus including at least one electronic integrated circuit providing a selectable interconnection apparatus to a corresponding at least one of said contacts, said method comprising the step of commanding said interface apparatus to place any of a plurality of signals on any of said plurality of contacts of said device communication connector apparatus, wherein said commanding step includes communicating instructions over a network to said module to determine the configuration of said signals on said contacts.

13. A method of configuring input/output channels on a configurable connectorized system, said system comprising a module including (i) a device communication connector apparatus with a plurality of contacts and (ii) an interface apparatus including at least one electronic integrated circuit providing a selectable interconnection apparatus to a corresponding at least one of said contacts, said method comprising the step of commanding said interface apparatus to place any of a plurality of signals on any of said plurality of contacts of said device communication connector apparatus, wherein said module comprises a circuit board and said commanding step includes configuring jumper blocks on said circuit board.

14. A method of configuring input/output channels on a configurable connectorized system, said system comprising a module including (i) a device communication connector apparatus with a plurality of contacts (ii) an interface apparatus including at least one electronic integrated circuit providing a selectable interconnection apparatus to a corresponding at least one of said contacts, and (iii) an embedded web server programmed to provide configuration pages for devices connected to said device communication connector, said method comprising the steps of:
(a) connecting said module to a personal computer;
(b) opening one of said configuration pages; and
(c) providing inputs on said personal computer to determine a specific interconnection apparatus for each of said contacts.

15. A method as in claim 14 wherein said connecting step utilizes an Ethernet cable.

16. A method as in claim 14 wherein said connecting step includes connecting with a wireless communication device.

17. A method as in claim 14 wherein said providing step includes dragging and dropping icons on said configuration page to determine a specific interconnection apparatus for at least one of said contacts.

18. A method of directing a signal between a system controller and at least one device using a configurable connectorized system, said system comprising a module including (i) a device communication connector apparatus with a plurality of contacts and (ii) an interface apparatus including at least one electronic integrated circuit providing a selectable interconnection apparatus to a corresponding at least one of said contacts, said method comprising the steps of
(a) creating a signal path between said system controller and said module;
(b) connecting at least one conductor between said device communication connector apparatus and a first device; and
(c) causing said module to place any of a plurality of signals on said plurality of contacts of said device communication connector apparatus, wherein said causing step includes a system controller communicating instructions to said module to determine the configuration of said signals on said contacts.

19. A method of directing a signal between a system controller and at least one device using a configurable connectorized system, said system comprising a module including (i) a device communication connector apparatus with a plurality of contacts and (ii) an interface apparatus including at least one electronic integrated circuit providing a selectable interconnection apparatus to a corresponding at least one of said contacts, said method comprising the steps of:
  (a) creating a signal path between said system controller and said module;
  (b) connecting at least one conductor between said device communication connector apparatus and a first device; and
  (c) causing said module to place any of a plurality of signals on said plurality of contacts of said device communication connector apparatus, wherein said causing step includes communicating instructions over a network to said module to determine the configuration of said signals on said contacts.

20. A method of directing a signal between a system controller and at least one device using a configurable connectorized system, said system comprising a module including (i) a device communication connector apparatus with a plurality of contacts and (ii) an interface apparatus including at least one electronic integrated circuit providing a selectable interconnection apparatus to a corresponding at least one of said contacts, said method comprising the steps of:
  (a) creating a signal path between said system controller and said module;
  (b) connecting at least one conductor between said device communication connector apparatus and a first device; and
  (c) causing said module to place any of a plurality of signals on said plurality of contacts of said device communication connector apparatus, wherein said module is a circuit board and said causing step includes configuring jumper blocks on said circuit board.

* * * * *